Dec. 27, 1938.  A. S. MOFFAT  2,141,759
HEATING DEVICE FOR CURLS
Filed June 10, 1937  2 Sheets-Sheet 1
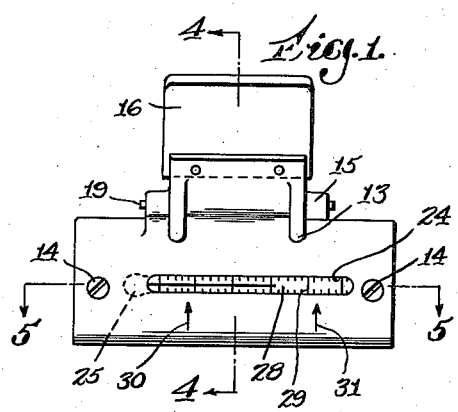
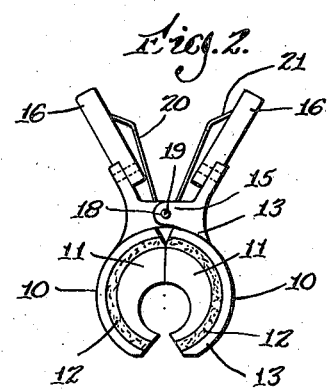
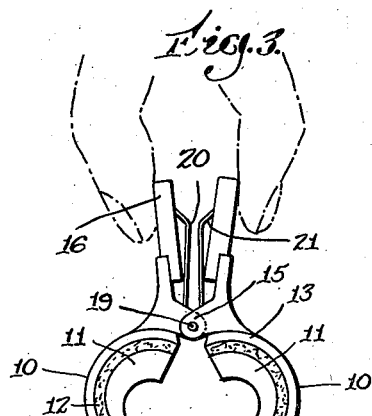
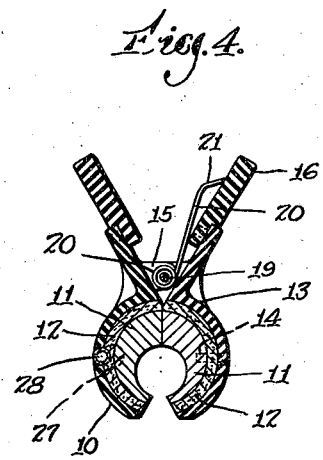
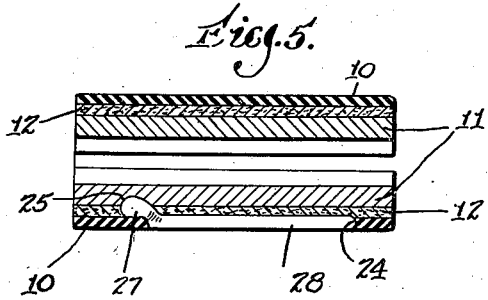
Inventor
Albert S. Moffat
by Harold E. Cole
attorney Dec. 27, 1938.  A. S. MOFFAT  2,141,759
HEATING DEVICE FOR CURLS
Filed June 10, 1937  2 Sheets-Sheet 2

Inventor
Albert S. Moffat
by Harold E. Cole
Attorney

Patented Dec. 27, 1938

2,141,759

UNITED STATES PATENT OFFICE 2,141,759

HEATING DEVICE FOR CURLS

Albert S. Moffat, Watertown, Mass., assignor to Harvey C. Wheeler, Boston, Mass.

Application June 10, 1937, Serial No. 147,462

1 Claim. (Cl. 132—36)

This invention relates to a heating device for curls.

At the present time it is a common practice to use clamp-like heating devices to set curls, first placing said devices in a heater and when they become sufficiently hot they are removed and placed on a curl until they are no longer sufficiently hot, or the curl is set. These devices cannot indicate the temperature they have been heated to, yet if one is too hot the hair will be scorched, and should it be left on the curl after cooling off it accomplishes nothing and is otherwise unsatisfactory. Accordingly, it is my object to provide a heating device for curls with means for measuring and indicating the temperature of the device, and with guides which show the temperature point that is too hot for use on hair and the point where it is too cool to have any effect. A further object is to provide such a device that is practically as compact as those now in use and can be manufactured and sold at a relatively low cost. Still another object is to improve upon the construction of the parts forming my device so that it will better retain the heat and provide better outside protection for the user.

The foregoing and other objects which will appear as the nature of the invention is better understood, may be accomplished by a construction, combination and arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claim.

In the drawings:

Figure 1 is a front elevational view of my heating device for curls.

Figure 2 is an end elevational view of my heating device in normal or closed position.

Figure 3 is an end elevational view of my heating device in open position.

Figure 4 is a sectional view taken on the line 4—4 of Figure 1.

Figure 5 is a sectional view taken on the line 5—5 of Figure 1.

Figure 6:
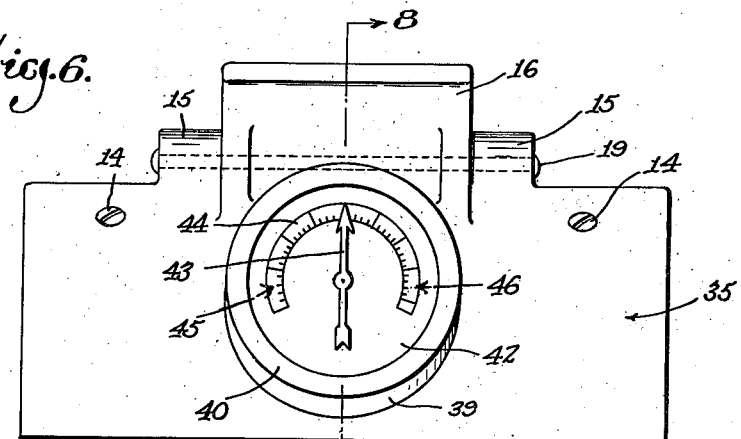
Figure 6 is a front elevational view showing my heating device with a modified form of thermometer.

As illustrated, my heating device has a pair of side members or jaws 10 each of which consists of an inner plate 11 preferably made of metal, an intermediate layer or sheet of asbestos 12 or other heat resisting material, and an outside layer or cover 13 which is preferably made of Bakelite or material having qualities of low heat conductivity. Said parts 11, 12 and 13 are held in assembled position by screws 14. Extending above each of said side members 10 and preferably integral with said outside layers 13 is a pair of ears 15 spaced apart, while extending above is a handle member 16. My device is opened or closed by the movement of said handle members 16 in the usual way. Said ears 15 have holes 18 extending therethrough into which a pin 19 extends, extending between the holes 18 in both said ears and thereby movably holding the side members 10 of my device together. A spring 20 extends between said side members 10 and is coiled around said pin 19 as illustrated in Figure 3 of the drawings, its ends bearing on said handle members 16 as at 21, and being so positioned and tensioned as to normally keep my said device closed.

In one of the side members 10 a recess 24 is formed which terminates at one end in an interior inner recess 25 which extends into the metal inner plate 11, and is adapted to receive a bulb 27 of a well known type of thermometer such as a mercury thermometer, which has the usual tube 28 which fits into said recess 24, and has a scale 29 to indicate the temperature. Adjacent said scale 29 there are arrows or guide marks 30 and 31 to indicate the lowest and the highest temperature respectively at which my device is effective and safe. Said recess 24 extends from the outer surface of a side member 10 slightly into said intermediate layer 12, and the said tube 28 is preferably slightly below said outer surface. Said recess 25 extends into the interior of said side member as illustrated in Figure 5 of the drawings, and said bulb 27 extends into said metal inner plate 11 so that the mercury therein will immediately respond when said inner plate 11 is heated. It is protected exteriorly by said outside layer 13.

In operation my device is heated until the mercury in said tube 28 reaches the arrow 31, whereupon it is placed on a curl until the curl is set or until the mercury returns to the said arrow 30, which indicates that my device has cooled to a point where it is no longer effective.

Figure 7:
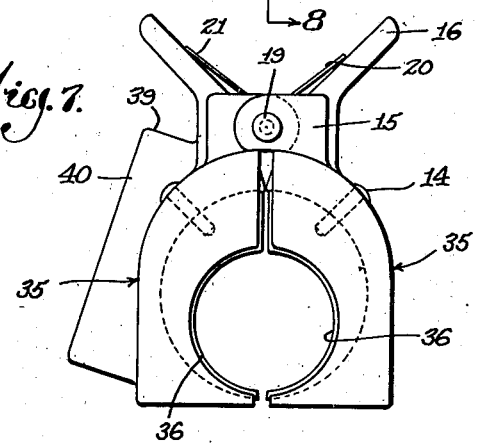
Figure 7 is an end elevational view of my heating device shown in Figure 6.
Figure 8:
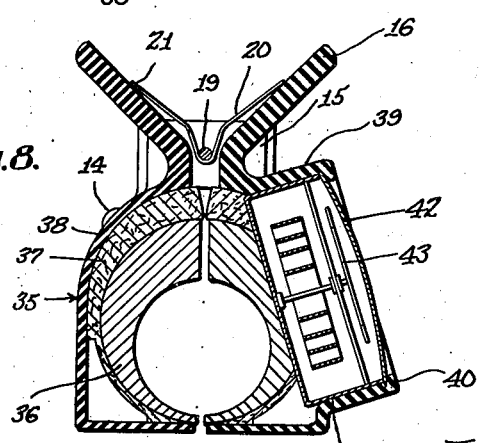
Figure 8 is a sectional view taken on the line 8—8 of Figure 7.

In the modification shown in Figures 6, 7 and 8, I provide the usual side members 35 consisting of an inner plate 36 preferably of metal, an intermediate layer or sheet of asbestos 37, and an outside layer or cover 38 which is preferably made of Bakelite or the like, being the same construction as the said side members 10. One of said side members has a recess 41 therein extending into said inner plate 36, around which recess a housing 39 is formed having an outer rim 40, in which housing a resistance or dial type of thermometer 42 of a well known type is mounted, which has a visible pointer 43 and a scale 44 on the face thereof, with guide marks 45 and 46 to indicate the lowest and the highest temperatures respectively, for the same purpose as the arrows 30 and 31 previously described. This thermometer 42 projects beyond the outer surface of said side member 35 it is mounted in, as illustrated in Figure 7 of the drawings.

What I claim is:

A heating device for curls comprising two side members adapted to be heated, each of said members embodying an inner heat conductive plate and an outer heat insulating portion, means movably connecting said side members whereby each is movable away from the other, and temperature indicating means mounted in the outer portion of one of said side members having a bulb closely fitting in a recess of the inner conductive plate of said member, said indicating means having a reading portion arranged for convenient and unobstructed inspection in the use of the device.

ALBERT S. MOFFAT.